March 18, 1930.                N. SUTCLIFFE                1,751,296
                                 NUT LOCK
                             Filed June 7, 1929

Nathaniel Sutcliffe, INVENTOR

BY Victor J. Evans
ATTORNEY

WITNESS

Patented Mar. 18, 1930

1,751,296

UNITED STATES PATENT OFFICE

NATHANIEL SUTCLIFFE, OF NEWARK, NEW JERSEY

NUT LOCK

Application filed June 7, 1929. Serial No. 369,215.

This invention relates to nut locks, and has for its primary object the provision of a device of this character which will be positive of action, inexpensive in its cost of manufacture and highly effective for the purpose of establishing a relatively permanent or locked condition of the nut upon the shank of a bolt.

Another object of the invention is to provide a nut lock in which no changes need be made in the construction of what I will hereinafter refer to as a standard or commercial bolt.

Another object of the invention is to provide a nut lock which will operate to hold the nut against casual displacement from the bolt and at the same time permit of a relative separation of the parts for the purpose of repairs.

A still further object of the invention is to provide a nut lock wherein will be included a threaded shank and means for locking the nut to the shank without destroying the threads thereof.

With the above and other objects in view which will appear as the nature of the invention is better understood, the same consists in the improved construction and novel arrangements of parts which will hereinafter be fully described and particularly pointed out in the claim.

In the accompanying drawings, has been illustrated, a single and preferred form of the invention, it being, however, understood that no limitations are necessarily made to the precise structural details therein exhibited, but that changes, alterations and modifications within the scope of the claim may be resorted to when desired.

In carrying the invention into practice, I use a standard or commercial bolt 5 whose shank 6 is threaded in the customary manner at 7. The opposite end of the shank is provided with a head 8.

Figure 1:
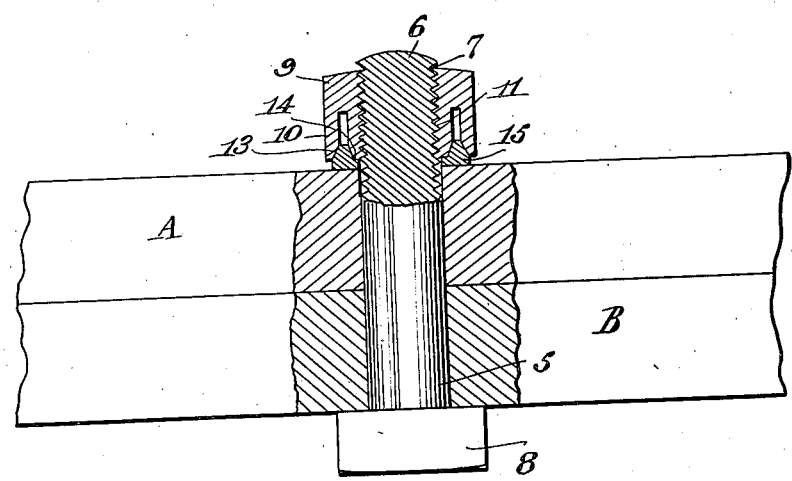
Figure 1 is a vertical section through the nut lock with parts in elevation.
Figure 4:
Figure 4 is a side view of the washer.
Figure 2:
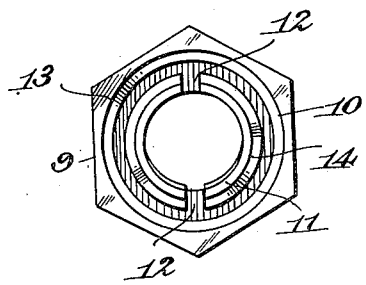
Figure 2 is a bottom plan view of the nut.
Figure 3:
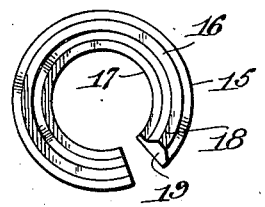
Figure 3 is a bottom plan view of the washer.

The nut 9 is provided on its underside with concentric spaced walls 10 and 11, the latter split at diametrically opposite points as shown at 12—12 so that said wall 11 is adapted to move with respect to the thread 7 of the shank 5. The wall 10 is continuous and the terminal face 13 thereof is beveled. The terminal face 14 of the split wall 11 is beveled on an angle opposite to that of the face 13 or on an intersecting plane therewith. I use in connection with this form of nut a split spiral washer 15. This washer is formed of springy material, preferably steel and the same is provided with beveled faces 16 and 17 respectively adapted to co-act with the aforesaid faces 13 and 14 whereby after the bolt 5 is passed through the conventional objects A and B to be connected with each other, and the washer 15 associated with the bolt and with the nut 9 as shown in Figure 1, these faces 16 and 17 will come into firm contact with the faces 13 and 14 and cause the split wall 11 to be contracted and brought into binding engagement with the thread 7. In the act of driving the nut 9 on to the bolt, the wall 10 acts as an anchor for the washer and the arrangement positively compels the said split wall 11 to satisfactorily contact and bind itself with the thread.

The normal high end 18 of the split washer 15 is beveled at 19 so that when it is desired to remove the nut from the bolt the former can be rotated over the washer without the latter interfering with such rotation.

From the construction described it will be seen that the nut can be conveniently and quickly locked to the bolt so that the former is held against casual loss and that the same can be separated from the bolt as the occasion demands and without injury to the thread of the bolt.

While I have herein fully shown and described and have pointed out in the appended claim certain novel features of construction, arrangement and operation which characterize my invention, it will be understood by those skilled in the art that various omissions, substitutions and changes in the forms, proportions, sizes, of the materials used, and of their operation, may be made without departing from the spirit of my invention.

What is claimed as new is:—

A nut lock comprising a bolt having a threaded shank, a nut having concentric walls spaced apart, the outer one of said walls being continuous and the inner one split at diametrically opposite points, the said walls respectively provided with oppositely beveled faces, and a split washer of substantially spiral formation associated with the bolt and said nut and provided with oppositely beveled faces adapted to co-act with the corresponding faces of said concentric walls, one terminal of said washer having a beveled face adapted to permit of retrograde rotation of the nut upon the bolt and to freely cause the split ends of one of said concentric walls to freely pass over said washer.

In testimony whereof I have affixed my signature.

NATHANIEL SUTCLIFFE.